(12) United States Patent
Tai et al.

(10) Patent No.: US 7,846,393 B2
(45) Date of Patent: Dec. 7, 2010

(54) MEMBRANE FILTER FOR CAPTURING CIRCULATING TUMOR CELLS

(75) Inventors: Yu-Chong Tai, Pasadena, CA (US); Siyang Zheng, Pasadena, CA (US); Henry Lin, San Marino, CA (US); Ram Datar, Alhambra, CA (US); Richard Cote, Los Angeles, CA (US)

(73) Assignees: California Institute of Technology, Pasadena, CA (US); University of Southern California, Los Angeles, CA (US)

( * ) Notice: Subject to any disclaimer, the term of this patent is extended or adjusted under 35 U.S.C. 154(b) by 938 days.

(21) Appl. No.: 11/408,501

(22) Filed: Apr. 20, 2006

(65) Prior Publication Data

US 2006/0254972 A1    Nov. 16, 2006

Related U.S. Application Data

(60) Provisional application No. 60/673,571, filed on Apr. 21, 2005.

(51) Int. Cl.
*B01L 99/00* (2010.01)

(52) U.S. Cl. .................. 422/101; 210/490; 210/500.26; 210/506; 210/767; 210/435; 422/99; 435/4; 435/366; 435/283.1

(58) Field of Classification Search ........................ None
See application file for complete search history.

(56) References Cited

U.S. PATENT DOCUMENTS

| 5,804,366 | A | 9/1998 | Hu et al. |
|---|---|---|---|
| 6,177,019 | B1 * | 1/2001 | Castino et al. ............. 210/767 |
| 6,464,337 | B2 | 10/2002 | Roy et al. |
| 6,598,750 | B2 * | 7/2003 | Tai et al. ..................... 210/490 |
| 6,622,872 | B1 | 9/2003 | Tai et al. |
| 2005/0135455 | A1 | 6/2005 | Peeters et al. |
| 2006/0007983 | A1 | 1/2006 | Tai et al. |
| 2006/0204699 | A1 | 9/2006 | Maltezos et al. |
| 2007/0000838 | A1 | 1/2007 | Shih et al. |

FOREIGN PATENT DOCUMENTS

WO    WO 99/24141 A1    5/1999

OTHER PUBLICATIONS

International Search Report mailed on Sep. 14, 2006, for International Patent Application No. PCT/US06/15501, filed on Apr. 21, 2006, 1 page.
Kahn, H.J. et al., "Enumeration of circulating tumor cells in the blood of breast cancer patients after filtration enrichment: correlation with disease stage," *Breast Cancer Research and Treatment*, 2004, vol. 86, pp. 237-247.

* cited by examiner

*Primary Examiner*—Jill Warden
*Assistant Examiner*—Sally A Sakelaris
(74) *Attorney, Agent, or Firm*—Townsend and Townsend and Crew LLP

(57) ABSTRACT

The present invention provides a parylene-based membrane filter device for capturing of circulating tumor cells (CTC). The membrane filter has an array of holes having a predetermined geometric design with precisely controlled size, shape and density. In one aspect, the device has a stack of substantially parallel membrane filters with uniformly-spaced and/or monodispersed holes.

21 Claims, 4 Drawing Sheets

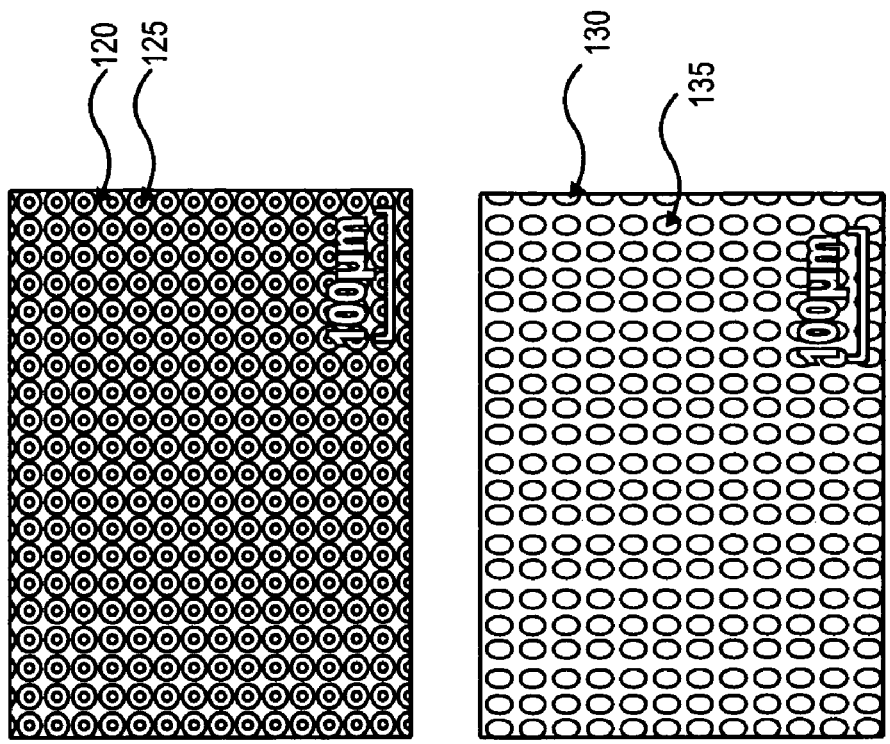
FIG. 1B
FIG. 1C
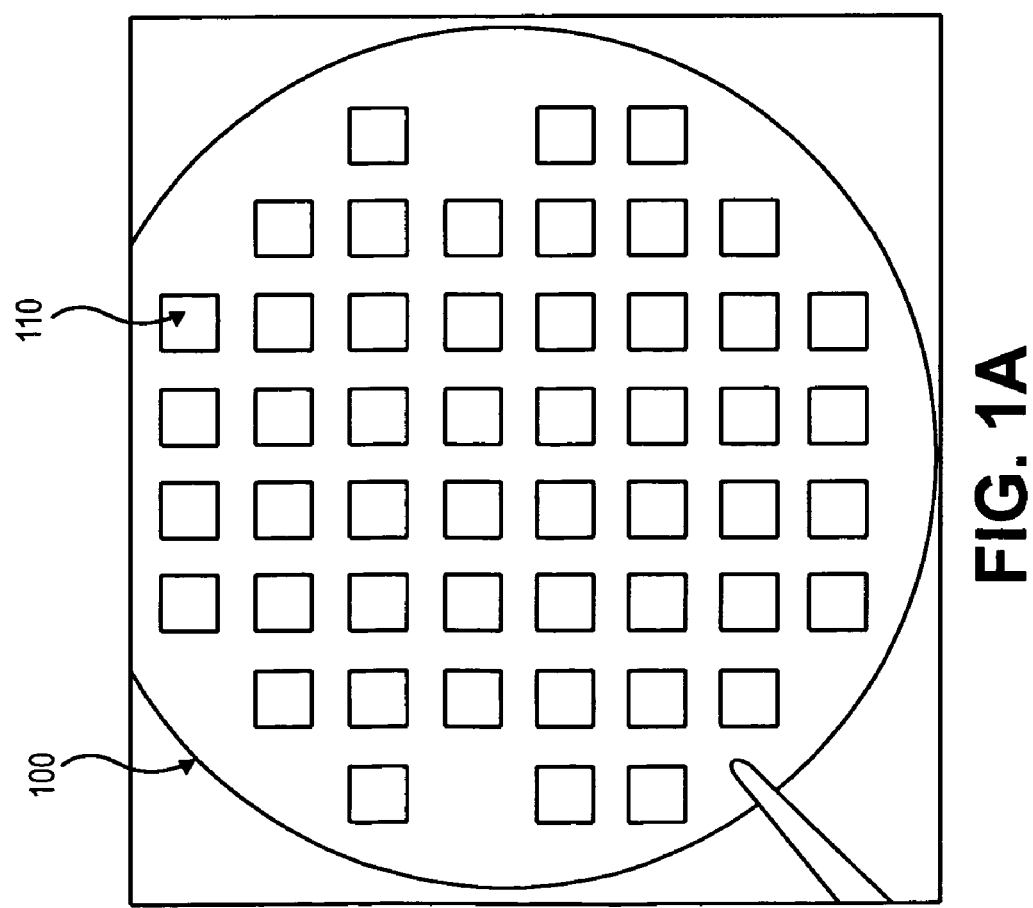
FIG. 1A

MEMBRANE FILTER FOR CAPTURING CIRCULATING TUMOR CELLS

CROSS-REFERENCES TO RELATED APPLICATIONS

This application claims priority to U.S. Provisional Patent Application No. 60/673,571, filed Apr. 21, 2005, which is hereby incorporated by reference in its entirety for all purposes. This application claims priority and incorporates by reference U.S. patent application Ser. No. 11/408,499, entitled "Use of Parylene Membrane Filters," filed on even date herewith.

STATEMENT AS TO RIGHTS TO INVENTIONS MADE UNDER FEDERALLY SPONSORED RESEARCH OR DEVELOPMENT

Not applicable

BACKGROUND OF THE INVENTION

A mechanical filter can be used to remove, filter, or collect particles. This filtering and collection of particles can be used for sampling of particles, chemical detection, and/or biological cell analysis.

One of the most important determinants of prognosis and management of cancer is the absence or presence of metastatic dissemination of tumor cells at the time of initial presentation and during treatment. The early spread of tumor cells to lymph nodes or bone marrow is referred to as circulating tumor cells (CTC) when in the peripheral blood. It has been well established that these CTC can be present even in patients who have undergone complete removal of the primary tumor. The detection of CTC has proven to be a useful tool in determining the likelihood of disease progression.

CTC exist in blood on the order of 1 per 10 billion blood cells. Currently available technologies are inadequate to identify circulating tumor cells with requisite sensitivity, efficiency and specificity. The present techniques including density gradient separation, immunomagnetic separation and density gradient immunomagnetic separation filtration used for CTC capture and identification require multiple procedural steps, handling of relatively large volumes of sample, substantial human intervention, are labor intensive, are extremely high cost and lack reliability and standardization for the detection methods. Commercial filtration systems have low efficiencies. Commercial membrane filters, such as polycarbonate filters, show randomly and sparsely distributed holes, with many noticeably fused, resulting in larger openings. Therefore, it is clear that the development of a device capable of detecting the earliest metastatic spread of tumor in the peripheral blood can revolutionize the approach to the disease management.

Since the average size of CTC's for most common epithelial cancers is significantly larger than most blood cells, separation based on size can be very effective. Membrane filter allows the processing of a large volume of blood and parylene provides a unique filter substrate due to its processability, stability, flexibility and biocompatibility. Therefore, it is desirable to develop a filtration system to overcome the above and other problems, in particular, for the efficient capturing and detecting of extremely low concentration of cancer cells in the blood.

BRIEF SUMMARY OF THE INVENTION

The present invention provides a novel parylene-based membrane filter device. Advantageously, the filter and device are highly efficient in capturing and detecting of low concentration circulating tumor cells (CTC).

According to the present invention, a membrane filter device having a parylene membrane is provided. The parylene membrane has an array of holes with a predetermined geometric design. The geometric design includes, for example, a size, a shape and density. In one aspect, the design of the membrane is such that only cancer cells are captured, while other cells and materials in the blood are filtered through. The invention also provides the use of stacks of multiple membranes in the filter. Parylene offers the advantages of flexibility and biocompatibility. The efficiency of the membrane filter can be optimized by adjusting the size, shape and density of the holes on the membrane. In certain aspect, the filter of the present invention has a figure of merit up to 890.

According to one aspect of the present invention, a membrane filter device is provided. The membrane filter device has a parylene membrane mounted in a housing. The membrane has an array of holes with a predetermined geometric design. In one embodiment, the membrane has an array of uniformly spaced holes. In another embodiment, the dimension of the holes on the membrane is monodispersed. In yet another embodiment, the parylene substrate is in contact with a metal layer.

According to another aspect of the present invention, a membrane filter device is provided. The membrane filter device has a parylene membrane comprising an array of holes with a predetermined geometric design. In one embodiment, the device has at least two parylene membranes within a housing. The membranes have an array of holes with a predetermined geometric design. In another embodiment, the membranes are substantially parallel to each other. In yet another embodiment, a sandwich layer is optionally placed between any of the two parylene membranes. In still another embodiment, the array of holes is uniformly-spaced and has a monodispersed size distribution. In a further embodiment, the parylene substrate is in contact with a metal layer.

According to yet another aspect of the present invention, a method of forming a membrane filter device is provided. The method typically includes the formation of an array of holes with a predetermined geometric design in an area of a parylene membrane and the assembly of the membrane in a housing. The predetermined geometric design includes the precisely controlled size, shape and density of the holes. In one embodiment, the geometric design includes an array of monodispersed holes.

According to still another aspect of the present invention, a method for isolating a cell is provided. The method includes obtaining a sample containing the cell and passing the sample through at least a first membrane filter comprising a parylene substrate having a first plurality of holes having a predetermined geometric design.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1 illustrates a fabricated membrane filter device. FIG. 1A shows a parylene film with 50 devices. FIGS. 1B and 1C show portions of one of such 50 devices.

FIG. 4 illustrates images of scanning electron microscope (SEM) of a commercial membrane filter and the membrane filters of the present invention.

DETAILED DESCRIPTION OF THE INVENTION

Figure 2:
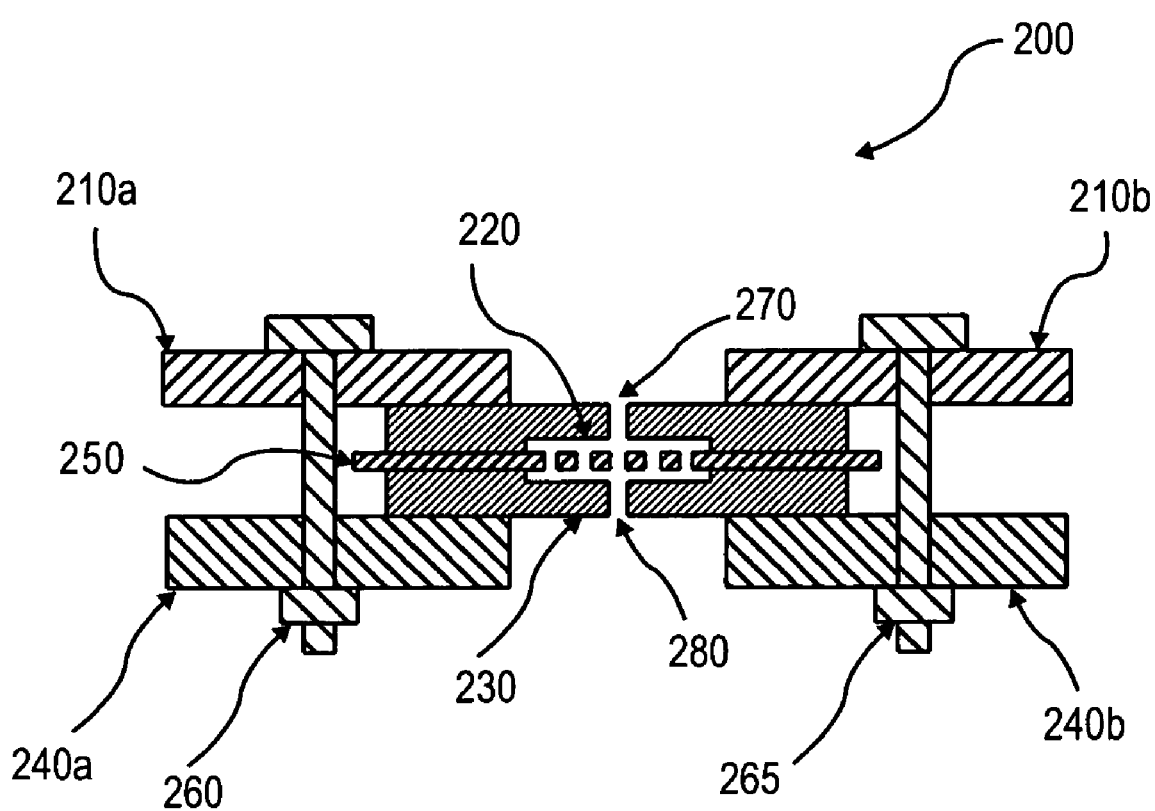
FIG. 2 illustrates a typical parylene membrane filter device assembly.

In one aspect, the present invention provides a novel membrane filter device for capturing, for example, low concentration circulating tumor cells (CTC). The device includes a parylene substrate having an array of holes with a predetermined geometric design.

As used herein, the term "parylene" refers to a polymer having formulae I, II, and III or combinations thereof. The polymer can be a homopolymer, a copolymer, a polymer blend or combinations thereof. $R^1$, $R^2$, $R^7$ and $R^8$ are each independently H, alkyl, heteroalkyl, aryl or halogen. The alkyl can be a $C_1$-$C_6$ hydrocarbon radical. The halogen is Cl, F, Br, or I. Heteroalkyl is an alkyl substituent containing at least one heteroatom, such as O, S, N, Si or P.

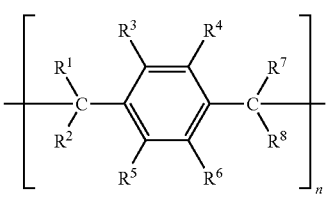

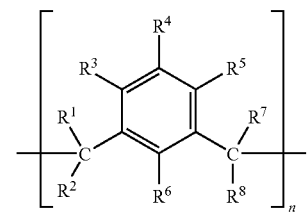

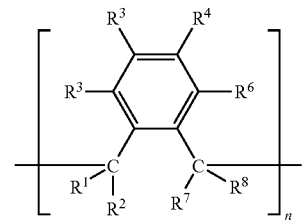

$R^3$-$R^6$ are each independently H, alkyl, aryl, halogen, heteroalkyl, hydroxyl, amino, alkylamino, arylamino, aroylamino, carbamoylamino, aryloxy, acyl, thio, alkylthio, cyano, alkoxy. An alkyl group can be a substituted alkyl having up to 29 carbon atoms. A substituted alkyl can be mono- or polyunsaturated alkenyl or alkynyl radical having in each case up to 29 carbon atoms, i.e., a substituted $C_1$-$C_{29}$alkyl, $C_2$-$C_{29}$alkenyl or $C_2$-$C_{29}$alkynyl radical. Suitable substitutents are also cyclic radicals. The substituted alkyls can be methyl, ethyl, or propyl radical, carrying one or more identical or different radicals. Depending on the nature of the substitutents, these can be attached via a single or multiple bond or in a spiro form. Preferred subtitutents are halogen, such as Cl, F, Br or I, amino, lower alkylamino, lower alkanoylamino, aroylamino, such as, in particular, benzoyl amino, hyroxyamino, hydroxyimino, lower alkoxyamino, aroxyamino, such as, in particular, phenoxyamino. Lower alkylthio includes $C_1$-$C_6$alkylthiols. Aryloxycarbonyl includes phenoxycarbonyl, benzyloxycarbonyl, hydroxyaminocarbonyl, aminoacylamino, carbamoyl, amidino. Aryoxy can be phenyloxy, aminocarbonyl-oxy, oxo, aminosulfonyl and lower alkylsulfonyl-amino. Heteroalkyl is an alkyl substitutent having one or more heteroatoms in the alkyl substitutents, in particular, mercaptoalkyl having up to 29 carbon atoms, aminoalkyl, phosphinoalkyl, haloalkyl, hydoxyalkyl or silylalkyl. Preferably, parylene has a structure represented by the formula I. In addition, preferred parylene also includes commercially available parylene, C, F, A, AM, N, and D.

Parylene is a USP Class VI biocompatible polymer that can be deposited through a highly-conformal vapor deposition process. Types of parylene include parylene C, F, A, AM, N, and D. Of the three most common types of parylene shown below, parylene C is perhaps the most widely used in industry. The advantages of the use of parylene include its proven biocompatibility, its strength, elasticity and flexibility (e.g., Young's modulus≈4 GPa), its conformal pinhole-free room-temperature deposition, its low dielectric constant (≈3) high volume resistivity (>$10^{16}$ Ω-cm), its transparency, and its ease of manipulation using standard microfabrication techniques such as reactive ion etching (RIE). Several research groups have used parylene C deposition as a method of creating a biocompatible, water-blocking seal around electrode arrays typically fabricated using a polyimide substrate. This is necessary because most polyimides have a moisture absorption that is more than an order of magnitude higher than that of parylene C. Some specialized polyimide films have lower moisture absorption, but they require high-temperature curing steps.

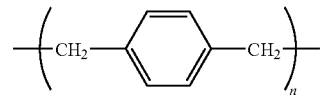

Parylene N

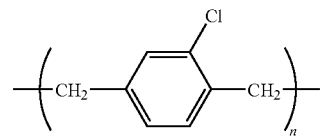

Parylene C

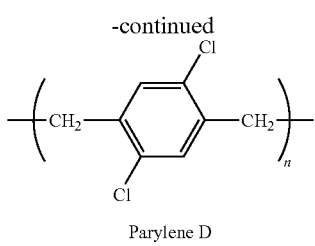

Parylene D

As used herein, the term "monodispersed" refers to openings or holes on the membrane filter having substantially identical size, dimension and shape.

Parylene or parylene-like material used in the present invention exhibits a unique mechanical property as a filtration substrate. It has the advantage of elasticity, flexibility, biocompatibility, and ease of manufacturing and processing into different shapes and sizes. The material is also chemically inert and easy to achieve controlled surface property.

Existing technologies using magnetic beads, density-gradient centrifugation or polycarbonate filtration for the capturing of tumor cells typically have poor recovery rates and extended processing time in the order of hours. Commercial membrane filters frequently contain randomly and sparsely distributed holes, with many of them noticeably fused, resulting in large openings that can contribute to lower recovery rate. One of the many advantages of parylene membranes include its superior elasticity and flexibility properties. Surprisingly, the present invention provides parylene membrane filters that are highly efficient in filtering large volumes of fluid to capture the desired particles without altering the geometry and property of the membrane holes or causing damage to the filtrate. For example, filtration of biological fluids can be accomplished within minutes (i.e., 5<min) using parylene membrane filter of the present invention, but may takes hours by other filtration methods. Membranes, which do not exhibit parylene or parylene-like properties, show low filtration efficiency, have tendency to rupture or can cause damage to certain filtrates, such as cells.

Various parylene and parylene-like materials can be used as substrates in the present invention. Other materials, such as polyimide, polysiloxane, polyester, polyacrylate, cellulose, Teflon and polycarbonate can also be used as filter substrates. The substrates used in the present invention are not limited to materials discussed above, but also include other materials, which perform substantially the same function as parylene, in substantially the same way as parylene and achieve substantially the same result as parylene, i.e., having a figure of merit of about 890 and/or having a Young's modulus≈4 GPa. Figure of merit provides a measure of the efficiency of the filtration device. A large figure of merit number is an indication of higher filtration efficiency. Figure of merit is defined as the recovery rate divided by time. Recovery rate is defined as particles recovered divided by the total number of target particles. The time used in the calculation of figure of merit is the total processing time to conduct the testing.

FIG. 1 illustrates a fabricated membrane filter 100. In one embodiment, parylene is used as a filter substrate. Examples of other materials include, but are not limited to, polyimide, polycarbonate, polyester, polyacrylate, polysiloxane, polysaccharides, cellulose, nylon, and Teflon. FIG. 1 illustrates that membrane filters having different geometric designs can be employed to achieve the desired results. A geometric design includes the plan of size, shape and density of the openings on the membranes. FIG. 1A shows a parylene film with 50 individual devices. A representative device 110 is shown. FIG. 1B shows a portion of one of the membrane device having circular openings 125. In one embodiment, the circular holes are monodispersed. In another embodiment, the holes are uniformly-spaced. FIG. 1C shows a portion of one of the membrane device having oval holes 135. In one embodiment, the oval holes are monodispersed. In another embodiment, the holes are uniformly-spaced. The shape of the holes on the membrane includes, but is not limited to, a circle, an oval, a symmetric polygon, an unsymmetrical polygon, an irregular shape and combinations thereof. In some embodiments, the membrane filter has circular, rectangular, or hexagonal holes.

FIG. 1B illustrates a membrane having monodispersed and uniformly spaced 10 µm circular holes. FIG. 1C illustrates a membrane having monodispersed and uniformly-spaced 8 µm×14 µm oval holes. The hole size can be precisely controlled using reactive ion etching (RIE) technology (see, U.S. Pat. No. 6,598,750 incorporated herein by reference). In some embodiments, hole dimensions and opening factors can vary from 0.1 µm to 12 µm and from 4 to 45%, respectively. Preferably, the hole dimensions are from 5 µm to 12 µm. In some embodiments, the density of the holes can be precisely controlled up to 40,000 holes per square millimeter. The thickness of the parylene membrane can also be controlled. In certain aspects, a thicker membrane is needed for a higher density of holes. Parylene membranes with various thicknesses from about 1 µm to 15 µm can be prepared. In one embodiment, a 10 µm parylene membrane is used.

In some embodiments, parylene membrane filters having uniformly-spaced holes are prepared. In other embodiments, parylene membrane filters having an array of monodispersed holes are prepared. The membranes with monodispersed and uniformly distributed holes have a higher cell capturing efficiency than membranes with randomly distributed and polydispersed holes. In certain embodiments, the membranes preferably have high density and/or monodispersed holes.

In still yet other embodiments, a metal layer is deposited on top of the membrane layer. The metal layer can be, for example, in direct contact with the membrane or through an intermediate layer. Any metal suitable for the deposition on the membrane can be used. Suitable metals used for coating the membrane include, but are not limited to, main group metals and transition metals, in particular, Au, Pt, Ag, Pd, Cu, Ir, Zn, Ni, Fe, Ru, Rh and Si.

FIG. 2 illustrates one aspect of the membrane filter device 200. The device includes a parylene membrane 250 mounted inside a housing. The housing can adopt a variety of sizes and shapes, which include, but are not limited to, tubular, spherical and cubical shapes. In one embodiment, the housing is made of a top chamber 220 having an insertion port 270 and a bottom chamber 230 having an exit port 280. Various materials can be used for the construction of the chambers. The materials include, but are not limited to, polysiloxane, polycarbonate, polyacrylate, polyethylene, polystyrene, polysaccharides and copolymers and combinations thereof. In one embodiment, the material used for construction of the chambers is polydimethylsiloxane (PDMS). In one embodiment, the top chamber, the bottom chamber and a parylene membrane are clamped by two pairs of jigs (210a, 210b; 240a, 240b). The top jig 210a and 210b can be made of polyacrylate, polyketone, polystyrene, polypropylene and the like. The bottom jig is made of an engineering material, which includes, but is not limited to, a polyketone, a polysulfone, a polysulfide or a polyimide. In one embodiment, the bottom jig is polyetheretherketone (PEEK). The jigs are held together by suitable means 260 and 265, such as bolts, fasteners, screws, latches, links, joints, locks or unions.

Figure 3:
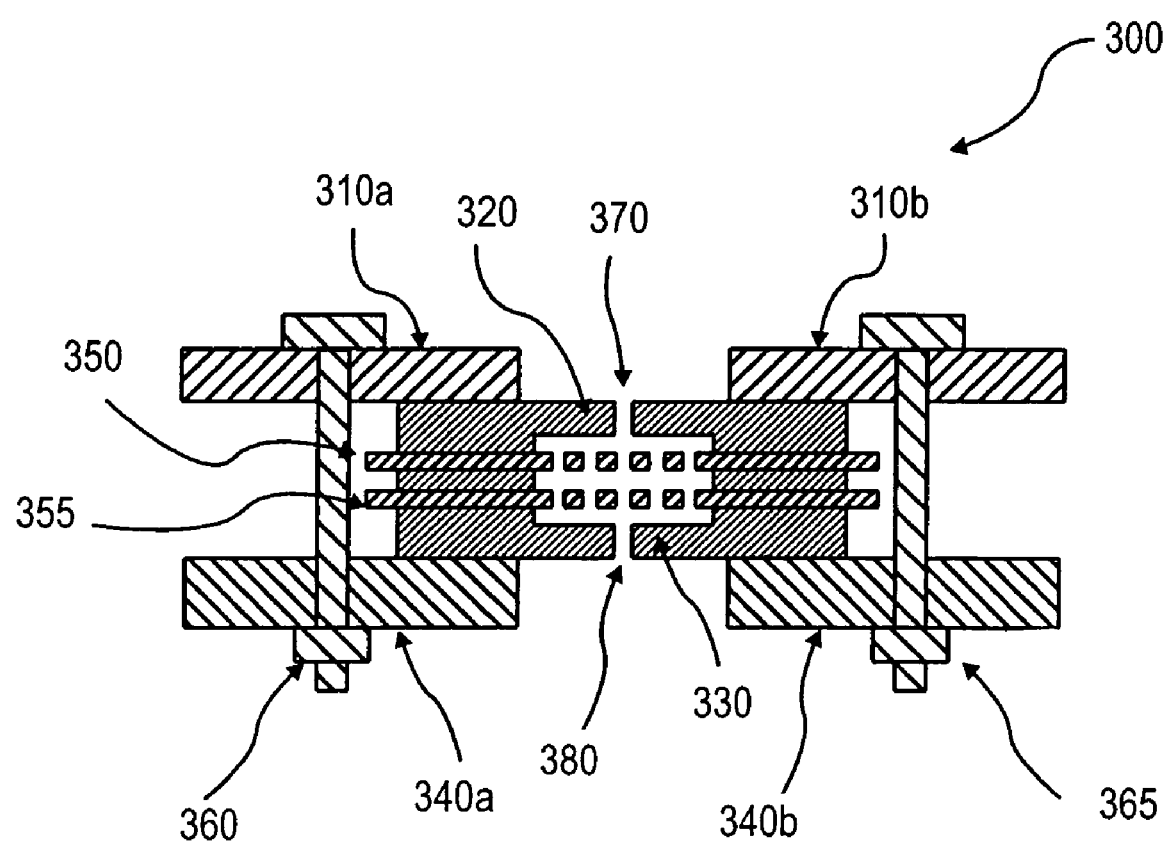
FIG. 3 illustrates the configuration of a filter device assembly with multiple parylene membranes.

In another aspect, filters having multiple membranes with various geometric designs can be used for the separation of CTC cells and other cells and particles in the blood. Each successive membrane can have the same or different geometric designs. For example, the size, shape and density of the holes can be varied at each membrane layer. An active sandwich layer can be optionally placed in between any two membrane filters. Alternatively, the sandwich layer can be an inert layer. FIG. 3 illustrates an embodiment of a two-membrane filter device 300. The top filter 350 and the bottom filter 355 are parylene or parylene-like membranes. The top filter and the bottom filters can have the same or different geometric designs. In one embodiment, the top filter has circular holes and the bottom filter has oval holes. In another embodiment, the dimension of the holes on the top filter is approximately 10 μm and the dimension of the holes on the bottom filter is 8 by 14 μm. In a preferred embodiment, each membrane has an array of monodispersed holes. In another preferred embodiment, each membrane has an array of uniformly-spaced holes. The parylene membranes 355 and 355 are mounted inside a housing. The housing can adopt a variety of sizes and shapes, which include, but is not limited to, tubular, spherical and cubical shapes. In one embodiment, the housing is made of a top chamber 320 having an insertion port 370 and a bottom chamber 330 having an exit port 380. Various materials can be used for the construction of the chambers. The materials include, but are not limited to, polysiloxane, polycarbonate, polyacrylate, polyethylene, polystyrene, polysaccharides and copolymers and combinations thereof. In one embodiment, the material used for construction of the chambers is polydimethylsiloxane (PDMS). In one embodiment, the top chamber, the bottom chamber and a parylene membrane are clamped by two pairs of jigs (310a, 310b; 340a,340b). The top jig 310a and 310b can be made of polyacrylate, polyketone, polystyrene, polypropylene and the like. The bottom jig is made of an engineering material, which includes, but is not limited to, a polyketone, a polysulfone, a polysulfide or a polyimide. In one embodiment, the bottom jig is polyetheretherketone (PEEK). The jigs are held together by suitable means 360 and 365, such as bolts, fasteners, screws, latches, links, joints, locks or unions.

In yet another embodiment, the present invention provides a membrane filter device having a plurality of membrane filters assembled inside a housing for the separation of fine particles, such as bacteria or viruses. Each of the upper membranes has a different geometric design from each of the adjacent lower membranes. The geometric design varies in the hole size, shape and density. The holes on each of the membranes are designed such that each successive layer only traps the desired cells or particles and allow undesired substance to pass through. For example, cells or bacteria passing through a first filter can be captured by the subsequent second or the third filter having a different geometric design.

The substrate used for each membrane can be the same material or different materials. The substrates used include, but are not limited to, parylene, polycarbonate, polyimide, polyvinyl acetate, nylon, Teflon, polyacrylate, and cellulose. In one embodiment, the substrate for each membrane is parylene.

Figure 4A:
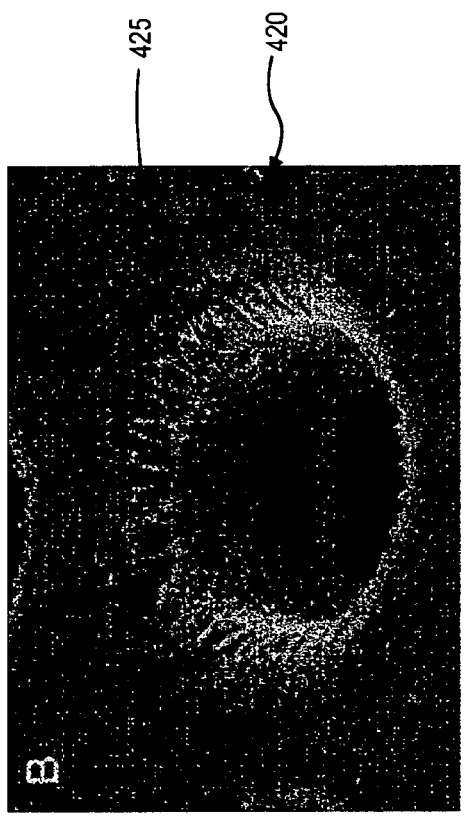
FIG. 4A shows an SEM image of a commercial membrane filter.
Figure 4B:
FIG. 4B shows the image of a microfabricated parylene membrane filter.
Figure 4C:
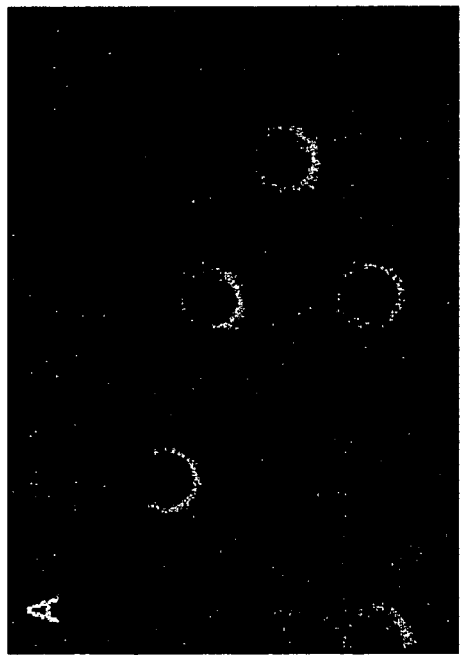
FIGS. 4C and 4D show images of parylene membrane filters with cells captured.
Figure 4D:
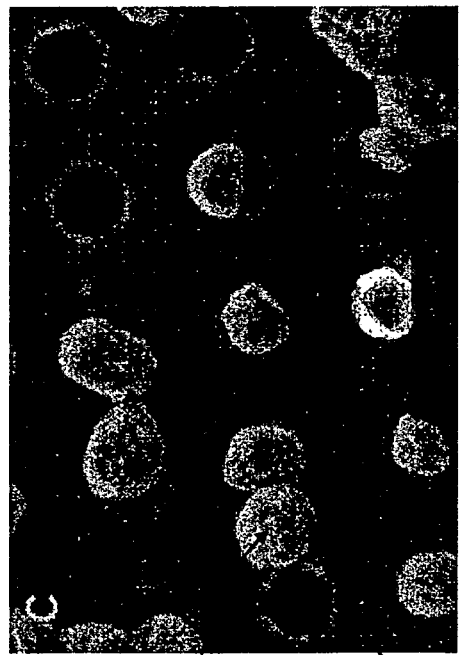

FIG. 4 illustrates the SEM images of the filter device of the present invention (FIGS. 4B-4D). FIG. 4A reveals randomly distributed holes and fused holes in the commercial filter device. The device of the present invention have a predetermined geometric design with an array of precisely controlled holes 425, 438 and 455, which have allowed an efficient and successful trapping of the tumor cells 435 and 458 (FIGS. 4B-4D). In one embodiment, prostate cancer cells are captured by the membrane filters.

The device of the present invention can be fabricated using spinning coating technology known in the art. In one aspect, a photoresist material can be first spin-coated on a silicon wafer. Next, a thin layer of substrate is deposited on top of the photoresist material. Finally, patterning is generated by reactive ion etching (RIE). Alternatively, a thin layer of substrate can be directly deposited on top of a silicon wafer. The film is released using water or an organic solvent. Common organic solvents suitable for releasing the film include, but are not limited to, ethanol, acetone, tetrahydrofuran, dichloromethane, chloroform, $C_1$-$C_8$ hydrocarbon solvents. Parylene membranes can be prepared according to a deposition technology (see, U.S. Pat. No. 6,598,750). In some embodiments, the photomaterial used is AZ1518; the substrate is a parylene, the preferred substrate is parylene-C. Filters as large as 8×8 square millimeters can be fabricated. A pressure can be optionally applied to the fluid to facilitate the filtration process. In one embodiment, the pressure applied to the fluid is generated by gravity. In another embodiment, the pressure applied to the fluid is generated by an electrokinetic, for example, electroosmosis, and a ratchet pump. In yet another embodiment, fluid pressure is generated using pneumatic or magneto hydrodynamic pumps. In yet a further embodiment, the pressure applied to the fluid is generated by a mechanical device. One example of a useful mechanical pressure generating device is a screw-type pumping device or a peristaltic pump.

The present invention also provides a method for isolating a cell. The method includes obtaining a sample containing the cell and passing the sample through at least a first membrane filter comprising a parylene substrate having a first plurality of holes having a predetermined geometric design.

In one aspect, the filtration of cancer cells can be conducted by inserting each syringe into ports of the top and the bottom chambers. A sample is loaded using the top syringe and dispensed manually to traverse the filter. The filtrate is collected by the bottom syringe. As an example, the filter device is tested for capturing prostate cells. Cultured cells derived from human metastatic prostatic adenocarcinoma (LNCaP) are stained with hematoxylin, and serially diluted in buffered saline to the desired numbers for device testing. The average diameter of LNCaP cells is measured to be 19 μm×3 μm. The recoveries for circular and oval designs are 87.3%±7.0% and 89.1%±7.0%, respectively (Tables 1 and 2). For detection limit tests, the cell numbers are lowered to less than 10 cells per milliliter. Tables 3 and 4 demonstrate that the device can capture as few as 4 tumor cells per milliliter.

TABLE 1

Recovery Test for Circular Hole Design

|  | 1 | 2 | 3 | 4 | 5 |
|---|---|---|---|---|---|
| Tumor Cells Added | 402 | 402 | 402 | 402 | 402 |
| Cells Recovered | 346 | 400 | 344 | 327 | 339 |
| Cells in Flow-Through | 2 | 1 | 0 | 1 | 0 |

TABLE 2

Recovery Test for Oval Hole Design

|  | 1 | 2 | 3 | 4 | 5 |
|---|---|---|---|---|---|
| Tumor Cells Added | 86 | 86 | 86 | 86 | 86 |
| Cells Recovered | 79 | 84 | 74 | 78 | 68 |
| Cells in Flow-Through | 0 | 0 | 0 | 0 | 0 |

TABLE 3

Capture Limit Test for Circular Hole Design

|  | 1 | 2 | 3 | 4 | 5 |
|---|---|---|---|---|---|
| Tumor Cells Added | 4 | 4 | 4 | 4 | 4 |
| Cells Recovered | 4 | 3 | 3 | 3 | 3 |
| Cells in Flow-Through | 0 | 0 | 0 | 0 | 0 |

TABLE 4

Capture Limit Test for Oval Hole Design

|  | 1 | 2 | 3 | 4 | 5 |
|---|---|---|---|---|---|
| Tumor Cells Added | 8-9 | 8-9 | 8-9 | 8-9 | 8-9 |
| Cells Recovered | 7 | 7 | 6 | 9 | 7 |
| Cells in Flow-Through | 0 | 0 | 0 | 0 | 0 |

TABLE 5

Recovery for Tumor Cells Spiked in 1 ml Whole Blood with Oval Hole Design

|  | 1 | 2 | 3 | 4 | 5 |
|---|---|---|---|---|---|
| Tumor Cells Added | 41 | 41 | 41 | 41 | 41 |
| Cells Recovered | 33 | 35 | 42 | 39 | 34 |
| Cells in Flow-Through | 0 | 0 | 0 | 0 | 0 |

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A membrane filter device, said device comprising:
    a membrane filter consisting of a parylene substrate, a portion of said membrane filter having an array of holes with a predetermined geometric design, wherein the array of holes is between 1,000 and 40,000 per square millimeter;
    a pressure generating device coupled to the filter for applying pressure to a sample to be filtered; and
    a housing surrounding said membrane filter wherein said portion is suspended free of the housing.

2. The device of claim 1, wherein said housing is comprised of a first chamber; a second chamber; and a means for connecting said first chamber and said second chamber.

3. The device of claim 1, wherein said membrane filter has a predetermined geometric design comprising a size, a shape and a density.

4. The device of claim 1, wherein said membrane filter has a figure of merit up to 890%/hr.

5. The device of claim 4, wherein said membrane filter has a figure of merit between about 800 to about 890%/hr.

6. The device of claim 1, wherein said membrane filter has a plurality of uniformly spaced holes.

7. The device of claim 1, wherein said membrane filter has a hole dimension ranging from about 5 μm to about 12 μm.

8. The device of claim 1, wherein said membrane filter has a hole shape selected from the group consisting of a circular, an elliptical, a symmetrical polygonal, an unsymmetrical polygonal, an irregular shape and combinations thereof.

9. The device of claim 1, wherein said membrane filter has a hole density up to about 40,000 holes per square millimeter.

10. The device of claim 1, wherein the thickness of said membrane is at least about 1 μm.

11. The device of claim 1, wherein said parylene is in contact with a metal layer.

12. The device of claim 11, wherein the metal is selected from the group consisting of Au, Pt, Ag, Pd, Cu, Ir, Zn, Ni, Fe, Ru, Rh and Si.

13. A membrane filter device, said membrane filter device comprising:
    a first membrane filter consisting of a parylene substrate, a portion of said membrane filter having an array of holes with a first predetermined geometric design, wherein the array of holes is between 1,000 and 40,000 per square millimeter and;
    a pressure generating device coupled to the filter for applying pressure to a sample to be filtered; and a housing surrounding said membrane filter wherein said portion is suspended free of the housing.

14. The device of claim 13, wherein said device comprising:
    a second membrane filter consisting of a parylene substrate, a portion of said membrane filter having an array of holes with a second predetermined geometric design, wherein said first membrane filter is disposed above said second membrane filter.

15. The device of claim 14, further comprising a housing, wherein the housing surrounds the first and second membrane filters and further wherein said portion of both membrane filters is suspended free of the housing.

16. The device of claim 14, wherein a sandwich layer is optionally disposed between said first membrane filter and said second membrane filter.

17. The device of claim 14, wherein said sandwich layer is an inert layer.

18. The device of claim 14, wherein said first membrane filter is substantially parallel to said second membrane filter.

19. The device of claim 14, wherein said first membrane has a circular hole and said second membrane has an oval hole.

20. A method of forming a membrane filter device claim 1, said method comprising:
    providing a parylene membrane;
    forming an array of holes with a predetermined geometric design in an area of a parylene membrane; and
    mounting said membrane in a housing to form said membrane filter device.

21. The method of claim 20, wherein said geometric design has a monodispersed hole size.

* * * * *